Dec. 10, 1935.  H. C. DONALIES ET AL  2,023,804
DISPLAY STAND
Filed July 24, 1934  2 Sheets-Sheet 1
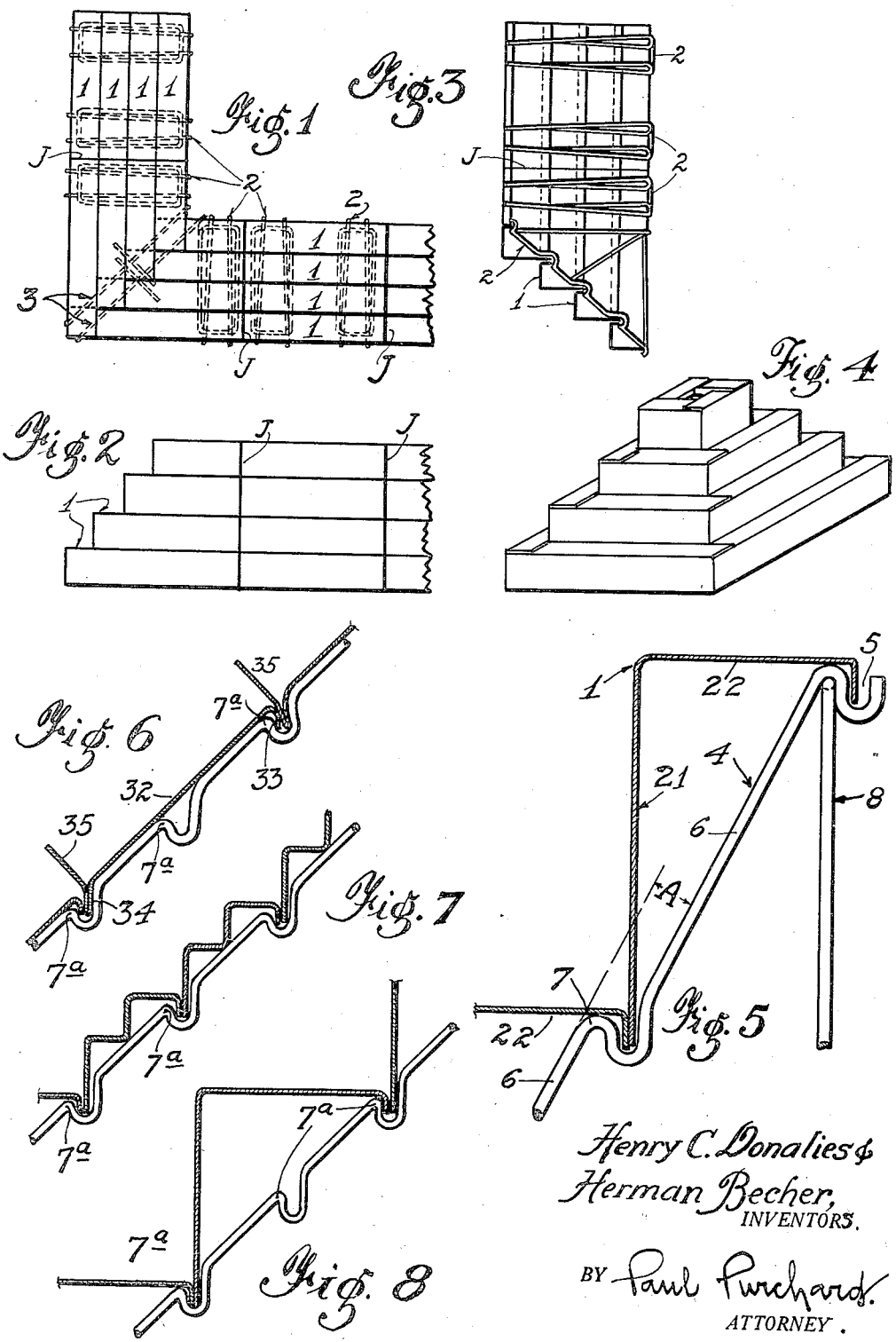
Henry C. Donalies &
Herman Becher,
INVENTORS.
BY Paul Purchard
ATTORNEY.

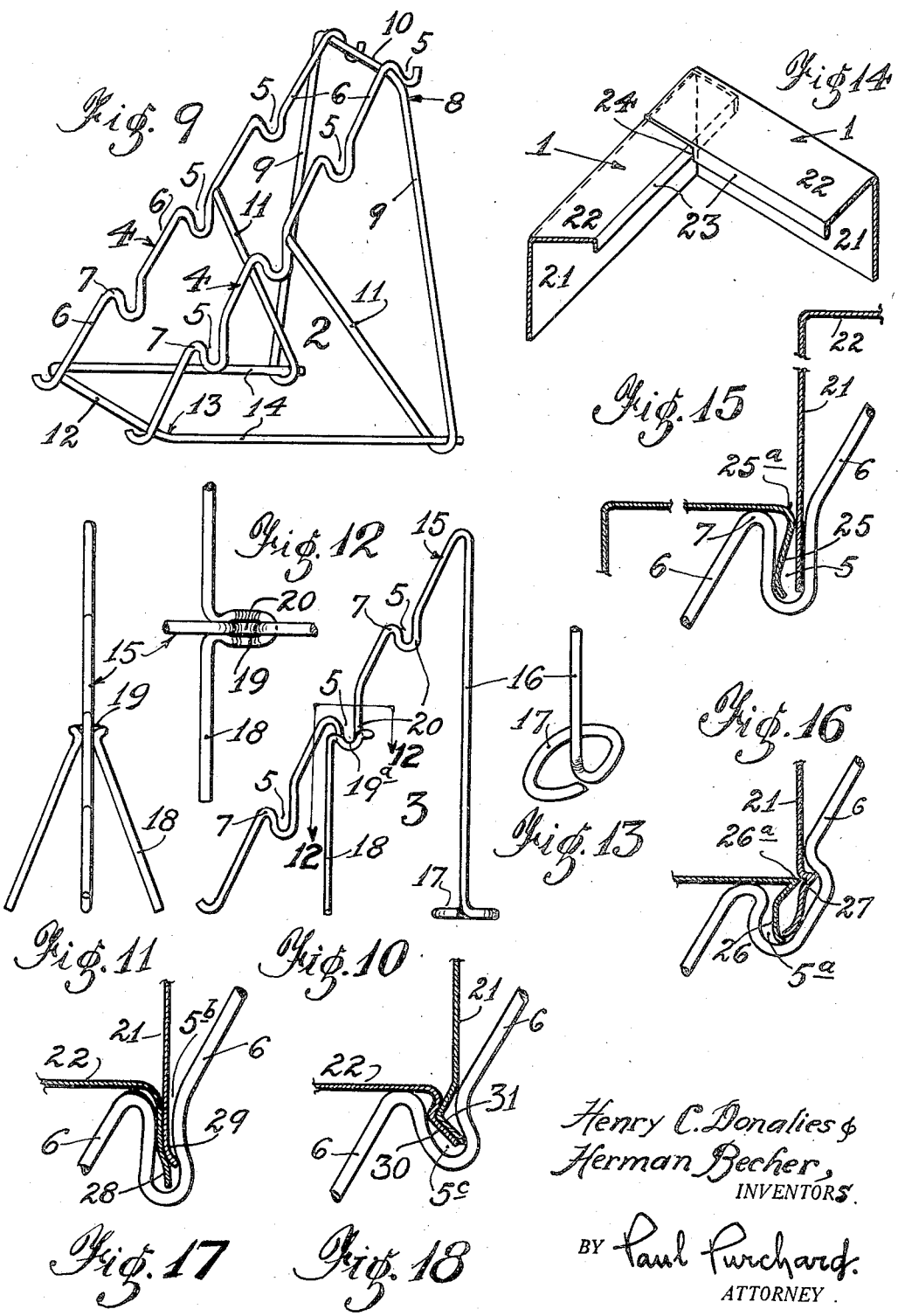

Patented Dec. 10, 1935

2,023,804

UNITED STATES PATENT OFFICE 2,023,804

DISPLAY STAND

Henry C. Donalies and Herman Becher, Pittsburgh, Pa.

Application July 24, 1934, Serial No. 736,696

10 Claims. (Cl. 211—142)

This invention relates to display stands and more in particular to display stands adapted for installation in store show-windows, or use as floor display stands.

One of the primary objects of this invention is to provide a display stand which is adapted for the display of goods in stepped formation, or on an upwardly inclined plane. Another object of this invention is to provide a display stand which is preferably made throughout of metal, which is light in weight and yet capable of supporting considerable loads. Yet another object is to provide a display stand composed of separate co-operating elements or parts which may be used separately or may be assembled together to produce display stands of any desired length and which permit of considerable angular adjustment between various sections or sub-divisions of the display stand to give the latter various angular shapes conforming either with the angular arrangement of a show-window or the surrounding floor space.

Still a further object of this invention is to provide a display stand comprising separate display shelves and supports therefor which may be easily nested or telescoped together to reduce the storage space required when not in use, or for shipment. Moreover, the object of this invention is also the provision of a display stand of practically universal adaptability, the component elements of which may be easily standardized as to size, thus enabling their manufacture at relatively low cost.

Additional features and advantages of this invention will appear in the course of the following description considered in connection with the accompanying drawings forming part of this application.

In the drawings:

Fig. 1 is a top plan view of an L-shaped display stand having four step-like display shelves, built in accordance with this invention.

Fig. 2 is a front elevation of Fig. 1.

Fig. 3 is a rear elevation of the same figure.

Fig. 4 is a perspective view showing, as an example of the adaptability of this invention, a stepped pyramidal display stand.

Fig. 5 is a fragmentary side elevation showing the preferred, or standard, type of shelf-unit used in display stands.

Fig. 6 is a fragmentary view showing a so-called banked display surface.

Figs. 7 and 8 are variations from Fig. 5 showing respectively smaller and larger display shelves applied to the same type of shelf-supports.

Fig. 9 is a perspective view showing a complete intermediate support used in display stands.

Fig. 10 is a side elevation showing a diagonal-support used in angularly disposed display-stands, such as shown in Fig. 1, for instance.

Fig. 11 is a front elevation of Fig. 10.

Fig. 12 is an enlarged, fragmentary, view of a section taken substantially on line 12—12, Fig. 10.

Fig. 13 is a fragmentary perspective view showing the rear foot of a diagonal-support.

Fig. 14 is a fragmentary perspective view showing the angular arrangement of two display shelves.

Figs. 15 to 18 show various methods of resiliently or interlockingly assembling the adjacent risers and treads of the individual step-like shelves of a display stand on the supports thereof.

Reference being had especially to Figs. 1 and 3, a display stand built in accordance with this invention consists of any desired number of step-like display shelves 1 arranged in stepped relation and supported at suitable intervals, proportioned to the load carried by the stand, by the intermediate-supports 2, made of any desired material, but preferably of strong steel wire.

When the display stand comprises different sections disposed angularly to each other, diagonal-supports 3 are also used at both sides of and parallel to the bisector of the angle formed by the adjacent sections, to additionally support the shelves at the corners of the stand.

Each intermediate-support, when made of wire, as shown in Fig. 9, consists of two stringers 4 suitably inclined in a common plane in accordance with the type of step-like shelves used in connection therewith. In these stringers are produced, by bending, the U-shaped indentations or recesses 5 horizontally spaced a distance equal to the tread of the shelves. The intermediate straight portions 6 of the stringers may be co-axially disposed, as shown in Figs. 6 to 8, but preferably, they are offset from each other a certain amount "A", Fig. 5; practice having shown that the bending of the recesses 5 is thereby facilitated because it reduces the sharpness of the bends 7, at the junction of said recesses with the adjacent straight portions 6 of the stringers; said bends also providing better supports for the tread portions of the shelves than do the sharper bends 7ᵃ shown in Figs. 6 to 8.

Both stringers 4 are supported in their inclined position by means of a substantially U-shaped back-stay 8 comprising two legs 9, the bridge portion 10 and the braces 11 which are formed by bending the lower extremities of the legs 9 in an upwardly inclined position until they meet the stringers 4 substantially at the middle thereof.

The upper ends of the stringers rest on the bridge portion 10 and their lower ends are held in proper spaced relation by means of the crossbar 12 of the U-shaped tie 13, the parallel legs 14 of which are connected to the legs of the back-stay 9, preferably in the bights formed by the legs 9 and the braces 11.

The four component parts of the intermediate-supports are rigidly connected together in any desired manner, such as by means of rivets, pins, soldering, and so forth; but direct welding is preferred because of its greater strength and speed of performance.

It will be noted from Fig. 9 that the intermediate-supports are made wider at the bottom than at the top. This provides a wider base which reduces the danger of tipping-over and also permits nesting together said supports for shipment or storage, when not in use.

The diagonal-support 3 comprises a stringer 15 substantially shaped as described above in relation to the intermediate-support, and an integral vertical leg 16 having at its lower end a base of any desired type and size. In the present embodiment this base is formed by bending the lower end of the leg into a ring 17, as is shown in Fig. 13, in particular.

Each diagonal-support is additionally sustained by means of a V-shaped prop 18, the apex of which is bent substantially horizontally to produce an eye 19 in which one of the recess-bends 20 of the stringer 15 is inserted. It will be noted that the sides of the eye are curved downwardly, as at 19a to conform with the curvature of the bight of the recess, so as not to interfere with the proper support of the display-shelves.

Each shelf element has the shape of a stair-step and comprises a riser 21 and a tread portion 22 of the desired size. The inner edge of the tread is bent downwardly to produce a longitudinal flange 23 which is inserted in one of the recesses 5 together with lower end of the riser of the shelf immediately above.

In long and straight display stands, the shelf sections are placed end to end, or but jointed, as shown at "J", Figs. 1 to 3, until the required length of shelf is attained. In angular display stands, such as shown in Fig. 1, either one of the intersecting tread portions of the shelves has the flange partly cut away as at 24, Fig. 14, to freely accommodate the underlying tread portion of the intersecting shelf forming the corner. The angle between such shelves is usually 90 degrees; but the construction shown permits of considerable variations in the angular relation between the two adjacent sections of an angular display stand, to satisfy local conditions, such as found especially in angular show-windows.

In Fig. 6 is suggested a so-called banked display in which the step-like shelves have been replaced by inclined shelves, each comprising a flat portion 32 having at its upper end a flange 33 and at the lower end another downwardly directed flange 34 doubled upwardly to produce a ledge 35 which prevents goods displayed on the shelf from sliding down.

When the kind of goods displayed requires it, the normal display shelves, which span two consecutive recesses in the supports 2 or 3, may be exchanged for smaller or larger display shelves, as suggested in Figs. 7 and 8, wherein the former shows display shelves half as large and the latter shelves twice as large as a normal shelf.

In practice, the riser and the flange of each shelf are bent at a slightly outwardly flaring angle with relation to the tread, just enough to facilitate the nesting together of said shelves for shipment or storing away, and the weight of the goods displayed on the shelves is relied upon to impart additional stability to the assembled structure.

If desired, these flanges and the lower ends of the risers may be shaped in such a manner as to produce frictional, resilient or interlocking engagement within the recesses 5 in the supports 2 or 3. Various alternative constructions for this purpose are suggested in Figs. 15 to 18.

In Fig. 15, the longitudinal flange 25 is bent at a slightly acute angle and suitably curved as shown, so as to be moderately deflected when inserted within the recesses 5 of the supports. The sheet metal used for the shelves is sufficiently resilient to cause the upper bend 25a to exert pressure against the lower end of the riser 21 and press same against the rear side of the recess.

Fig. 16 shows an interlocking resilient connection between the longitudinal flange 26 and the lower end of the riser 21, within a recess 5a of modified configuration. In this embodiment the pointed bend 26a in the tread engages a suitably shaped notch 27 in the riser and an additional contact is obtained between the extreme lower ends of both the flange and the riser by suitably curving same toward each other, as illustrated.

In the modified construction shown in Fig. 17 the recess 5b is somewhat restricted at its upper end and receives the slightly deformed and interlocking longitudinal flange 28 and lower end 29 of the riser 21. Here again the resiliency of the sheet metal used for the shelves permits the insertion or the extraction of the interlocking parts in or out of the recess 5b.

Fig. 18 is still another alternative construction for an interlocking engagement between the longitudinal flange 30 and the lower end 31 of the riser 21 within a modified recess 5c. This construction operates in a manner similar as described above in relation to Figs. 16 and 17 in particular.

It will, of course, be understood that the number of shelves in a display stand may be varied to suit the requirements of the trade and that various combinations of shelves may be used in combination with a given set of intermediate and diagonal supports. For instance, a display stand could be arranged to combine step-like shelves of any desired size, as shown in Figs. 1, 5, 7, and 8 with so-called banking-shelves, illustrated in Fig. 6, in accord with the kinds of goods to be exhibited. Also, if desired, the self-contained intermediate-supports 2 may be used alone for the display of certain goods, such as bar-shaped articles, or such which might be suspended from the recesses 5.

Although special emphasis has been placed on display stands made of metal wire and sheet metal, any other suitable and desired material could be used, either exclusively or in combination with some other materials, and the shelves provided with any desired surface finish and color to harmonize with the surroundings or with the individual tastes of the purchasers.

As will be understood, as suggested herein, there may be changes made in the construction, arrangement, of the details of this invention without departing from the field and scope of the same, and it is intended to include all such variations, as fall within the scope of the appended claims, in this application, in which the preferred forms only of the invention have been disclosed and illustrated.

We claim:

1. A display stand comprising a plurality of separate step-like shelves each consisting of a riser portion and a tread portion; a longitudinal flange positioned at the rear end of said tread portion and removable supports having recesses each constructed to removably receive the flange of one shelf and the lower end of the riser of the next following shelf, and means formed integrally on said flange and the lower end of said riser to secure said parts frictionally in said recess.

2. A display stand comprising a plurality of separate step-like shelves each consisting of a riser portion and a tread portion; a longitudinal flange positioned at the rear end of said tread portion, and removable supports for said shelves; each support having recesses each constructed to removably receive the flange of one shelf and the lower end of the riser of the next following shelf, and co-acting means formed integrally on said flange and lower end of the riser to secure said parts frictionally and interlockingly in said recess.

3. A display stand comprising a plurality of separate inclined display shelves each having a longitudinally downwardly directed flange at the lower and at the upper ends thereof; removable self-contained supports for said shelves, each support having recesses constructed to receive the upper flange of one shelf and the lower flange of the next following shelf.

4. A display stand comprising a plurality of separate inclined display shelves each having a longitudinal downwardly directed flange at the lower and at the upper ends thereof; removable self-contained supports for said shelves, each support having recesses constructed to receive the upper flange of one shelf and the lower flange of the next following shelf, and means on said flanges to frictionally and interlockingly secure same in said recesses.

5. A display stand consisting of a plurality of display sections disposed in angular relation to each other, each section comprising a plurality of step-like shelves each including a riser portion and a tread portion; a longitudinal flange positioned at the rear end of said tread portion; a plurality of intermediate-supports for supporting the straight portions of said sections and diagonal-supports positioned adjacent and parallel to the bisector of the angle between adjacent sections; said supports having recesses each constructed to removably receive the flange of one shelf and the lower end of the riser of the next following shelf.

6. A display stand consisting of a plurality of display sections disposed in angular relation to each other, each section comprising a plurality of step-like shelves each including a riser portion and a tread portion; a longitudinal flange positioned at the rear end of said tread portion; a plurality of removable intermediate-supports for supporting the straight portions of said sections; each support comprising two co-planar stringers; means to secure said stringers in selected spaced relation; a plurality of diagonal-supports positioned adjacent and parallel to the bisector of the angle between adjacent sections and each having a single stringer, and a plurality of recesses in said stringers each constructed to receive the flange of one shelf and the lower end of the riser of the next following shelf.

7. A display stand consisting of a plurality of display sections disposed in angular relation to each other, each section comprising a plurality of step-like shelves each including a riser portion and a tread portion; a longitudinal flange positioned at the rear end of said tread portion; a plurality of removable intermediate-supports for supporting the straight portions of said sections, each support comprising two co-planar stringers; means to secure said stringers in selected spaced relation; a plurality of diagonal-supports positioned at both sides of the bisector of the angle between adjacent sections, substantially parallel thereto and each having but a single stringer; and a plurality of recesses in said stringers each constructed to receive the flange of one shelf and the lower end of the riser of the next following shelf, and means to hold said diagonal-supports in upright position.

8. A display stand consisting of a plurality of display sections disposed in angular relation to each other, each section comprising a plurality of step-like shelves each including a riser portion and a tread portion; a longitudinal flange positioned at the rear end of said tread portion; a plurality of removable intermediate-supports for supporting the straight portions of said sections, each support comprising two co-planar stringers; means to secure said stringers in selected spaced relation; a plurality of diagonal-supports positioned at both sides of the bisector of the angle between adjacent sections substantially parallel thereto and each having but a single stringer; removable means to hold said diagonal-supports in upright position; a plurality of recesses in said stringers each constructed to receive the flange of one shelf and the lower end of the riser of the next following shelf; said intermediate-supports being arranged for telescopic assembly when not in use.

9. A display stand comprising a plurality of separate inclined display shelves each having a longitudinal downwardly directed flange at the lower and at the upper ends thereof; removable self-contained supports for said shelves, each support having recesses constructed to receive the upper flange of one shelf and the lower flange of the next following shelf, and means formed intergrally on said flanges to frictionally secure same in said recesses.

10. A display stand comprising a plurality of separate inclined display shelves each having a longitudinal downwardly directed flange at the lower and at the upper ends thereof; removable self-contained supports for said shelves, each support having recesses constructed to receive the upper flange of one shelf and the lower flange of the next following shelf, and coacting means formed integrally on said flanges to frictionally and interlockingly secure same in said recesses.

HENRY C. DONALIES.
HERMAN BECHER.